United States Patent
Joseph et al.

(10) Patent No.: US 10,904,812 B2
(45) Date of Patent: Jan. 26, 2021

(54) INCREASING RELIABILITY DURING MULTI-CONNECTIVITY HANDOVERS

(71) Applicant: QUALCOMM Incorporated, San Diego, CA (US)

(72) Inventors: Vinay Joseph, San Diego, CA (US); Mehmet Yavuz, San Diego, CA (US); Mostafa Khoshnevisan, San Diego, CA (US); Christophe Chevallier, San Diego, CA (US); Rajat Prakash, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/356,474

(22) Filed: Mar. 18, 2019

(65) Prior Publication Data

US 2019/0297552 A1 Sep. 26, 2019

Related U.S. Application Data

(60) Provisional application No. 62/646,771, filed on Mar. 22, 2018.

(51) Int. Cl.
*H04L 12/50* (2006.01)
*H04W 36/30* (2009.01)
(Continued)

(52) U.S. Cl.
CPC .......... *H04W 36/30* (2013.01); *H04L 1/0003* (2013.01); *H04L 1/0009* (2013.01);
(Continued)

(58) Field of Classification Search
CPC ........................................................ H04L 12/28
(Continued)

(56) References Cited

U.S. PATENT DOCUMENTS

| 2012/0002652 A1 | 1/2012 | Uln et al. |
| 2018/0014298 A1 | 1/2018 | Sun et al. |
| 2020/0092818 A1* | 3/2020 | Jiang ..................... H04W 24/10 |

FOREIGN PATENT DOCUMENTS

WO     2018031799 A1     2/2018

OTHER PUBLICATIONS

Huawei et al., "Discussion on NR Mobility Enhancements in Rel-16", 3GPP Draft; RP-180393 Mobility Enhancement for NR, 3rd Generation Partnership Project (3GPP), Mobile Competence Centre; 650, Route Des Lucioles; F-06921 Sophia-Antipolis Cedex; France, vol. TSG RAN, No. Chennai, India; Mar. 19, 2018-Mar. 22, 2018, Mar. 12, 2018 (Mar. 12, 2018), 4 Pages, XP051509541, Retrieved from the Internet: URL: https://www.3gpp.org/ftp/tsg_ran/TSG_RAN/TSGR_79/Docs/RP-180393.zip [retrieved on Mar. 12, 2018].

(Continued)

*Primary Examiner* — Dang T Ton
(74) *Attorney, Agent, or Firm* — Arent Fox, LLP

(57) ABSTRACT

The present disclosure generally relates to techniques to increase reliability of communications within a network during a low reliability period. The network may include a user equipment (UE) communicatively coupled with one or more transmit/receive points (TRPs), with the communications between the UE and the one more TRPs requiring a reliability above a first reliability threshold. A processor of a network entity may identify a low reliability period which occurs when the reliability of the communications is determined to be below a second reliability threshold. The processor may cause the network to perform one or more (Continued)

remedial actions to increase the reliability during the low reliability period.

26 Claims, 8 Drawing Sheets

(51) Int. Cl.
| | | |
|---|---|---|
| H04W 24/02 | (2009.01) | |
| H04W 36/08 | (2009.01) | |
| H04L 1/00 | (2006.01) | |
| H04L 1/18 | (2006.01) | |
| H04W 72/08 | (2009.01) | |
| H04W 72/04 | (2009.01) | |

(52) U.S. Cl.
CPC .......... *H04L 1/0026* (2013.01); *H04L 1/1812* (2013.01); *H04W 24/02* (2013.01); *H04W 36/08* (2013.01); *H04W 72/042* (2013.01); *H04W 72/0413* (2013.01); *H04W 72/085* (2013.01)

(58) Field of Classification Search
USPC .......................................... 370/329
See application file for complete search history.

(56) References Cited

OTHER PUBLICATIONS

Huawei et al., "PDSCH Reliability for URLLC", 3GPP Draft; R1-1800058, 3rd Generation Partnership Project (3GPP), Mobile Competence Centre, 650, Route Des Lucioles ; F-06921 Sophia-Antipolis Cedex, France, vol. RAN WG1, No. Vancouver, Canada; Jan. 22, 2018-Jan. 26, 2018, Jan. 13, 2018 (Jan. 13, 2018), 10 Pages, XP051384561, Retrieved from the Internet: URL: http://www.3gpp.org/ftp/tsg_ran/WG1_RL1/TSGR1_AH/NR_AH_1801/Docs/ [retrieved on Jan. 13, 2018].

International Search Report and Written Opinion—PCT/US2019/023015—ISA/EPO—dated Jun. 4, 2019.

VIVO: "Discussion on Ultra-Reliable Design for PDCCH", 3GPP Draft; R1-1719784 Discussion on Ultra-Reliable Design for PDCCH Final, 3rd Generation Partnership Project (3GPP), Mobile Competence Centre, 650, Route Des Lucioles; F-06921 Sophia-Antipolis Cedex, France, vol. RAN WG1, No. Reno, US, Nov. 27, 2017-Dec. 1, 2017, Nov. 18, 2017 (Nov. 18, 2017), 3 Pages, XP051369527, Retrieved from the Internet: URL: http://www.3gpp.org/ftp/tsg_ran/WG1_RL1/TSGR1_91/Docs/ [retrieved on Nov. 18, 2017].

\* cited by examiner

INCREASING RELIABILITY DURING MULTI-CONNECTIVITY HANDOVERS

CLAIM OF PRIORITY UNDER 35 U.S.C. § 120

This application claims the benefit of U.S. Provisional Application Ser. No. 62/646,771, entitled "INCREASING RELIABILITY DURING MULTI-CONNECTIVITY HANDOVERS" and filed on Mar. 22, 2018, which is expressly incorporated by reference in its entirety.

BACKGROUND

Aspects of the present disclosure relate generally to wireless communication networks, and more particularly, to increasing reliability during a low reliability period, such as during multi-connectivity handovers in a wireless communication network (e.g., a 5G New Radio system).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current handover solutions may not provide a desired level of reliability during the handover. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for increasing reliability during low reliability periods, e.g., during multi-connectivity handovers are disclosed by the present application. In an aspect, the present disclosure includes a method of wireless communications including identifying, by a processor of a network entity, a low reliability period for communications between a network comprising one or more transmit/receive points (TRPs) and a user equipment (UE). The communications require a reliability above a first threshold and the low reliability period occurs when reliability for the communications is determined to be below a second reliability threshold. The method further includes, causing by the processor, the network to perform one or more remedial actions to increase the reliability during the low reliability period.

In another aspect, the disclosure includes a network entity for increasing reliability during low reliability periods for wireless communications. The network entity may include a memory and a processor communicatively coupled with the memory. The processor may be configured to identify a low reliability period for communications between a network comprising one or more transmit/receive points (TRPs) and a user equipment (UE). The communications require a reliability above a first threshold and the low reliability period occurs when reliability for the communications is determined to be below a second reliability threshold. The processor may be further configured to cause the network to perform one or more remedial actions to increase the reliability during the low reliability period.

In another aspect, the disclosure includes a network entity for increasing reliability during low reliability periods for wireless communications. The network entity may include means for identifying a low reliability period for communications between a network comprising one or more transmit/receive points (TRPs) and a user equipment (UE). The communications require a reliability above a first threshold and the low reliability period occurs when reliability for the communications is determined to be below a second reliability threshold. The network entity may further includes means for causing the network to perform one or more remedial actions to increase the reliability during the low reliability period.

In another aspect, the disclosure includes a non-transitory computer-readable medium storing computer code executable by a processor of a network entity for increasing reliability during low reliability periods for wireless communications. The computer code when executed by the processor, cause the processor to identify a low reliability period for communications between a network comprising one or more transmit/receive points (TRPs) and a user equipment (UE). The communications require a reliability above a first threshold and the low reliability period occurs when reliability for the communications is determined to be below a second reliability threshold. The computer code when executed by the processor, cause the processor to cause the network to perform one or more remedial actions to increase the reliability during the low reliability period.

In an aspect, the present disclosure includes a method of wireless communications including identifying, by a processor of a user equipment (UE), a low reliability period for communications between the UE and one or more transmit/receiver points (TRPs) in a network. The communications require a reliability above a first threshold and the low reliability period occurs when reliability for the communications is determined to be below a second reliability threshold. The method further includes, causing by the processor, to perform one or more remedial actions to increase the reliability during the low reliability period.

In another aspect, the disclosure includes a user equipment (UE) for increasing reliability during low reliability periods for wireless communications. The UE may include a memory and a processor communicatively coupled with the memory. The processor may be configured to identify, by the processor, a low reliability period for communications between the UE and one or more transmit/receiver points (TRPs) in a network. The communications require a reliability above a first threshold and the low reliability period occurs when reliability for the communications is determined to be below a second reliability threshold. The processor may be further configured to perform one or more remedial actions in response to identifying the low reliability period to increase the reliability during the low reliability period.

In another aspect, the disclosure includes a user equipment (UE) for increasing reliability during low reliability periods for wireless communications. The UE may include means for identifying a low reliability period for communications between the UE and one or more transmit/receiver points (TRPs) in a network. The communications require a reliability above a first threshold and the low reliability period occurs when reliability for the communications is determined to be below a second reliability threshold. The UE may further include means for performing one or more remedial actions in response to identifying the low reliability period to increase the reliability during the low reliability period.

In another aspect, the disclosure includes a non-transitory computer-readable medium storing computer code executable by a processor of a user equipment (UE) for increasing reliability during low reliability periods for wireless communications. The computer code when executed by the processor, identify a low reliability period for communications between the UE and one or more transmit/receiver points (TRPs) in a network. The communications require a reliability above a first threshold and the low reliability period occurs when reliability for the communications is determined to be below a second reliability threshold. The computer code when executed by the processor, cause the processor to perform one or more remedial actions in response to identifying the low reliability period to increase the reliability during the low reliability period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
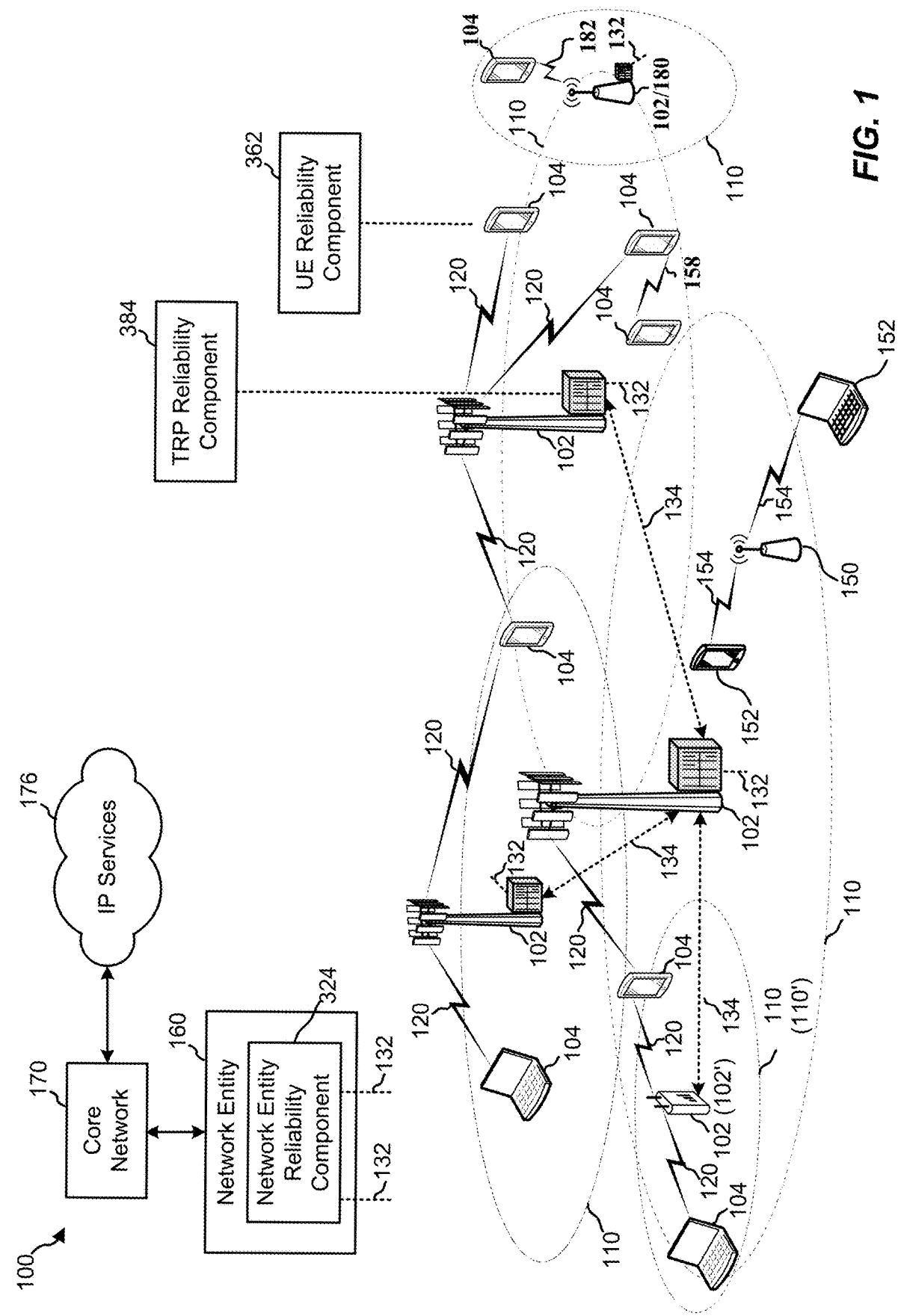
FIG. 1 is a schematic diagram of a wireless communication network including at least one of a network entity, a TRP, and a UE, each having a reliability component configured according to this disclosure to increase reliability during an identified low reliability period.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to techniques to increase reliability of communications within a network during a low reliability period. The network may include a user equipment (UE) communicatively coupled with one or more transmit/receive points (TRPs), with the communications (e.g., ultra-reliable-low latency communications (URLLC)) between the UE and the one more TRPs requiring a reliability above a first reliability threshold. A processor of a network entity may identify a low reliability period which occurs when the reliability of the communications is determined to be below a second reliability threshold. Reliability for the communications may be determined to be below the second reliability threshold during one or more of replacing a TRP among the one or more TRPs, removing a TRP among the one or more TRPs, and adding a TRP among the one or more TRPs. In an aspect, the first reliability threshold may be the same as the second reliability threshold. In another aspect, the second reliability threshold may be lower and/or a percentage of the first reliability threshold. The processor may cause the network to perform one or more remedial actions to increase the reliability during the low reliability period.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 902.11 (Wi-Fi), IEEE 902.16 (WiMAX), IEEE 902.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additional features of the present aspects are described in more detail below with respect to FIGS. 1-8.

Referring to FIG. 1, in accordance with various aspects of the present disclosure, an example wireless communication network 100 includes at least one UE 104 with a modem having a UE reliability component 362 for performing one or more remedial actions to increase reliability during a low reliability period. The wireless communication network 100 includes at least one transmit/receive point (TRP) 102 with a modem having a TRP reliability component 384 for performing one or more remedial actions to increase reliability during a low reliability period. Further, the wireless communication network 100 includes a network entity 160 configured to provide communications to and from a core network 170 which provides communications to IP services 176. Although the network entity 160 is shown as a separate entity in FIG. 1, the network entity 160 may be part of the core network 170. The network entity 160 includes a modem having a network entity reliability component 324 for causing the UE 104 and/or one or more TRPs 102 to perform one or more remedial actions to increase reliability during a low reliability period. Communications within the network 100, e.g., communications between the UE 104 and one or more TRPs 102, may require a reliability above a first reliability threshold. For example, the communications may be URLLC communications having a high reliability requirement (e.g., a packet error rate (PER) of $10^{-6}$) and a low latency requirement of 0.5 ms. Although this disclosure focuses on the reliability requirements, one of ordinary skill in the art would recognize that the one or more remedial actions discussed herein, may also improve latency issues if the communications experience latency falling below a latency threshold.

By using multi-TRP connectivity, the reliability of communications between the UE 104 and the one or more TRPs 102 may be increased. For example, the reliability of communications between the UE 104 and the one or more TRPs 102 may be improved by using packet duplication where uplink and/or downlink communications communicate using duplications of data packets. In an aspect, the UE 104 may support dual connectivity and associate with two different TRPs 102 on two different frequency carriers. In another aspect, the UE 104 may support carrier aggregation and may associate with more than one component carrier with one or more TRPs 102. For example, the UE 104 may associate with a primary component carrier of a TRP 102 and may associate with one or more secondary component carriers of the TRP 102. In another example, the UE 104 may associate with a carrier of a first TRP 102 and may associate with a carrier of a second TRP 102. When one of the TRPs 102 need to be replaced due to degradation in coverage associated with the TRP 102, a handover process may be initiated. During the handover or change of association, there by a period of outage where the UE 104 is neither associated with the previous TRP 102 nor a new TRP 102. Handover or change of association is discussed below in further detail with respect to FIG. 2. During the handover or change of association, the communications between the UE 104 and the one or more TRPs 102 may be referred to as a low reliability period.

The one or more UEs 104 and/or the one or more TRPs 102 may communicate with other UEs and/or other TRPs 102 via a core network 170, e.g., a 5G core network or an Evolved Packet Core (EPC), via the network entity 160. The TRPs 102 and the UEs 104 are able to communicate to a network, e.g., IP services 176, through the core network 170, e.g., a 5G core network, via the network entity 160. The network entity 160 may comprise of one or more of a gNB, cell, central unit, distributed unit, remote radio head, MultiFire access point, or operations and management (OAM) entity. The TRPs 102 (that may be collectively referred to as Next Generation Radio Access Network (NG-RAN) or Evolved Universal Mobile Telecommunications System (UMTS) Terrestrial Radio Access Network (E-UTRAN)) interface with the network entity 160 and/or core network 170 through backhaul links 132 (e.g., S1 interface). The backhaul links 132 may be wired or wireless. A TRP may comprise of one or more of network entity in Radio Access Network (RAN), a base station, a gNB, an eNB, a cell, a distributed unit (DU) and a Central Unit (CU) thereof. In addition to other functions, the TRPs 102 may perform one or more of the following functions: transfer of user data, radio channel ciphering and deciphering, integrity protection, header compression, mobility control functions (e.g., handover, dual connectivity), inter-cell interference coordination, scheduling of user data, packet duplication, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The TRPs 102 may communicate directly or indirectly (e.g., through the core network 170) with each other over backhaul links 134 (e.g., X2 interface). The backhaul links 134 may be wired or wireless.

The TRPs 102 may wirelessly communicate with the UEs 104. Each of the TRPs 102 may provide communication coverage for a respective geographic coverage area 110. There may be overlapping geographic coverage areas 110. For example, the small cell 102' may have a coverage area 110' that overlaps the coverage area 110 of one or more macro TRPs 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the TRPs 102 and the UEs 104 may include uplink (UL) (also referred to as reverse link) transmissions from a UE 104 to a TRP 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The TRPs 102/UEs 104 may use spectrum up to Y MHz (e.g., 5, 10, 15, 20, 100 MHz) bandwidth per carrier allocated in a carrier aggregation of up to a total of Y*x MHz (where x is a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the network.

A TRP 102, whether a small cell 102' or a large cell (e.g., macro base station), may include an eNB, gNodeB (gNB), or other type of base station. Some TRPs, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The gNB 180 may utilize beamforming 182 with the UE 104 to compensate for the extremely high path loss and short range.

The TRP 102 may also be referred to as a gNB, MgNB, SgNB, cell, PCell, SCell, Node B, evolved Node B (eNB), an access point, a base transceiver station, a radio base station, a radio transceiver, a transceiver function, a basic service set (BSS), an extended service set (ESS), a CU, a DU, or some other suitable terminology. The base station 102 provides an access point to the core network 170 for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2C:
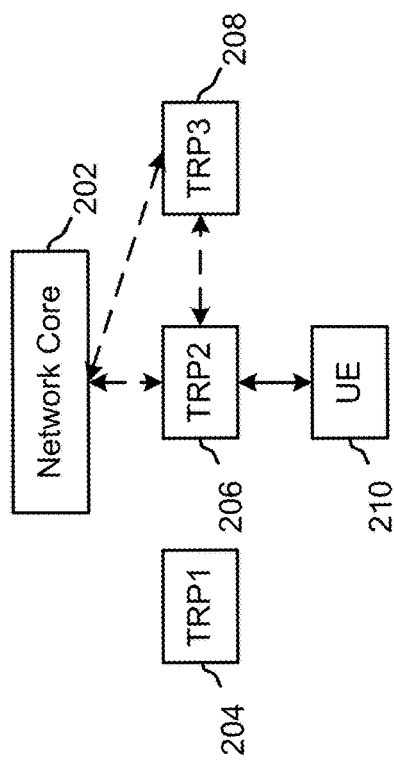
FIG. 2C is a schematic diagram of an example of a UE in multi-connectivity with two TRPs with one of the TRPs being a new TRP during a handover procedure.
Figure 2D:
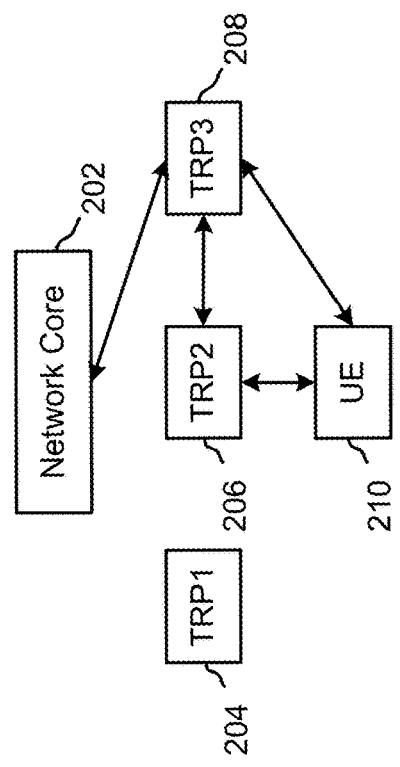
FIG. 2D is a schematic diagram of an example of a UE in multi-connectivity with two TRPs after a handover procedure.
Figure 2A:
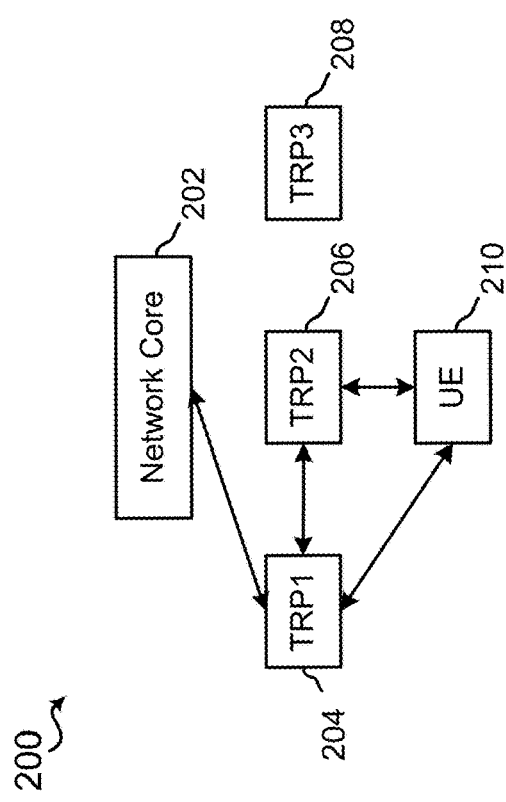
FIG. 2A is a schematic diagram of an example of a UE in multi-connectivity with two TRPs prior to a handover procedure.

Referring to FIGS. 2A-2D (and Appendix, slide 2), a schematic diagram of an example handover in a multi-connectivity scenario is illustrated. As shown in FIG. 2A, core network 202 is wireless communicatively coupled with TRP1 204, e.g., a primary TRP, and a UE 210. The TRP1 204 is wireless communicatively coupled with TRP2 206 (e.g., a secondary TRP) and the UE 210. TRP1 204 and TRP2 206 may communicate data packets with each other. In an aspect, TRP1 204 may receive one or more data packets from the core network 202, copy the one or more data packets and transmit the one or more data packets to the TRP2 206, with both TRP1 204 and TRP2 206 transmitting the one or more data packets to the UE 210. In another aspect, the UE 210 may transmit one or more data packets to TRP1 204 and TRP2 206. TRP2 206 may transmit the received one or more data packets to the TRP1 204. TRP1 204 may transmit the received one or more data packets to the core network 202. In an aspect, TRP1 204 may perform a duplication process to eliminate duplicative data packets and may transmit one set of the received one or more data packets to the core network 202. In another aspect, TRP1 204 may transmit the received one or more data packets from the UE 210 and the received one or more data packets from the TRP2 206 to the core network 202.

Figure 2B:
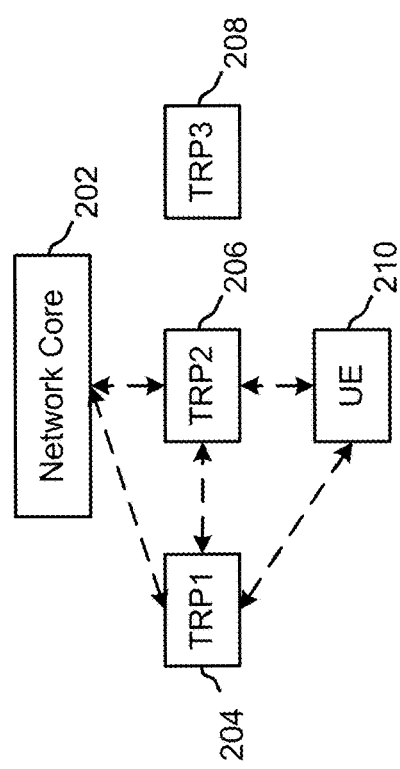
FIG. 2B is a schematic diagram of an example of a UE in multi-connectivity with two TRPs during a handover procedure.

As shown in FIGS. 2B and 2C, a handover from TRP1 to a TRP3 is shown. For example, the core network 202 may initiate a handover of the UE 210 from TRP1 204 to TRP3 208 as known in the art. During the handover of the UE 210 from TRP1 204 to TRP3 208, there may be a low reliability period because during the handover procedure, the UE 210 may only be communicatively coupled with TRP2 206. The low reliability period may refer to the UE 210 having less than a number of desired communicative couplings with TRPs. For example, the UE 210 may only be communicatively coupled with only one TRP during the handover period. As a result, the UE 210 may not receive duplicative data packets during a portion of the handover procedure. By not receiving the duplicative data packets, the UE 210 may not be receiving the one or more data packets with the desired reliability that is desired during a portion of the handover procedure. FIG. 2D shows the UE 210 communicatively coupled with both TRP2 206 and TRP3 208 after the handover procedure is complete.

Thus, during the low reliability period, e.g., during the handover procedure, there is a desire to increase the reliability during such a period. The low reliability period may be when the UE 210 is unable to associate with enough TRPs, e.g., when the UE 210 is changing association from one TRP to another TRP during a handover procedure. For example, due to degradation in coverage associated with a TRP, the UE 210 may undergo a handover procedure to transition from TRP1 204 to TRP3 208. During the handover procedure, the UE 210 may only be communicatively coupled with TRP2 206 and neither TRP1 204 nor TRP3 208. As a result, the UE 210 may not receive duplicative data packets and may experience reliability issues with the communication of the data packets. Similarly, when an SCell is added or replaced when using carrier aggregation, the process of adding or replacing the SCell may impact the communications and cause a low reliability period.

Figure 3:
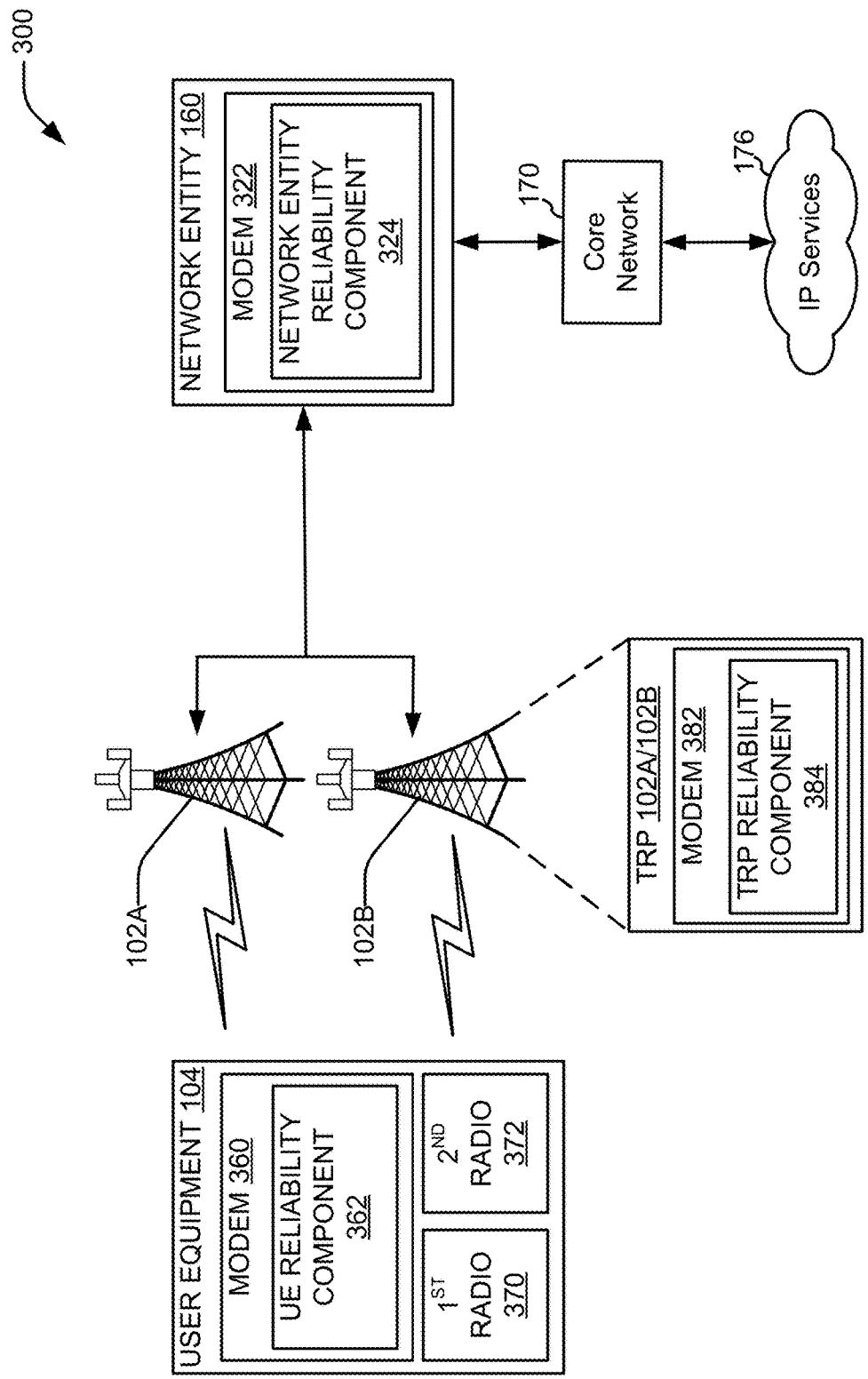
FIG. 3 is a schematic diagram of an example of a UE, two TRPs and a network entity for performing a procedure to increase reliability of communications during a low reliability period.

Referring to FIG. 3, in one aspect, the wireless communication system 300 includes a UE 104 in multi-communication with one or more TRPs 102A, 102B. Although FIG. 3 shows only two TRPs 102A, 102B in multi-communication with the UE 104, more than two TRPs 102A, 102B may be in multi-communication with the UE 104. The UE 104 may include dual radios: a first radio 370 and second radio 372. Each of the first radio 370 and second radio 372 may be configured to communicate with one or both of TRPs 102A, 102B, e.g., via multi-connectivity. For example, the UE 104 may wirelessly transmit/receive one or more data packets to/from one or both of the TRPs 102A, 102B using dual connectivity and/or carrier aggregation. For instance, for downlink communications, the UE 104 may receive one or more data packets from TRP 102A using the first radio 370 and may receive one or more data packets from TRP 102B using the second radio 372. Similarly, for uplink communications, the UE 104 may transmit one or more data packets to TRP 102A using the first radio 370 and may transmit one or more data packets to TRP 102B using the second radio 372. In another example, the UE 104 may communicate (e.g., uplink and downlink) with TRP 102A using the first radio 370 over a first sub-band and may communicate (e.g., uplink and downlink) with TRP 102A using the second radio 372 over a second sub-band. In an aspect, the communications between the UE 104 and TRP 102A and the communications between the UE 104 and the TRP 102B may use the same or different radio access technologies (RAT). Additionally, TRP 102A and TRP 102B may be the same type of TRPs (e.g., macrocell, picocell, or femtocell) or may be different types of TRPs.

The UE 104 may include a modem 360 having a UE reliability component 362 configured to increase reliability during a low reliability period. TRP 102A and TRP 102B may each include a modem 382 having a TRP reliability component 384 configured to increase reliability during a low reliability period. The network entity 160 may include a modem 322 having a network entity reliability component 324 configured to cause either the UE 104 and/or one or more of the TRPs 102A, 102B to increase the reliability of communications between the UE 104 and one or more of the TRPs 102A, 102B. In an aspect, the network entity 160 may not include a modem 322 and/or the network entity reliability component 324, such that the network entity reliability component 324 may be outside of a modem 322. In another aspect, the network reliability of communications may be increased by the UE 104 and/or one or more of the TRPs 102A, 102B by performing one or more remedial actions during the low reliability period. For example, the UE reliability component 362 may make measurements based on transmissions from a TRP 102A, 102B via the first radio 370 and can provide measurement reports to the TRP reliability component 384 of the TRP 102A, 102B via the first radio 370. The TRP reliability component 384 of the TRP 102A, 102B can forward or transmit the measurement report to the network entity reliability component 324 of network entity 160. The network entity reliability component 324 can use the measurement report and one or more additional factors (e.g., number of other TRPs that the UE is communicatively coupled with) to determine whether a PER is below a second reliability threshold. In an aspect, the first reliability threshold can be the PER for URLLC communications. In an aspect, the second reliability threshold can be the PER for URLLC communications (e.g., same as the first reliability threshold) or a percentage of the PER for URLLC communication, e.g., a value that will trigger a handover of a TRP 102A, 102B or a change of association for a TRP 102A, 102B. If the measurement report indicates that the PER is below the second reliability threshold, a low reliability period is determined and the network entity reliability component 324 may cause the UE 104 and/or one or more of the TRPs 102A, 102B to perform one or more remedial actions. In an aspect, the TRP 102A, 102B that is not entering the handover procedure can perform the one or more remedial actions. In another aspect, both the TRPS 102A and TRP 102B perform the one or more remedial actions. In another aspect, TRP reliability component 384 of the TRP 102A, 102B can determine if a handover of a TRP is ongoing and forward a message with the determination to the network entity reliability component 324 of network entity 160. Based on the message and one or more additional factors (e.g., number of other TRPs that the UE is communicatively coupled with), a low reliability period may be identified and the network entity reliability component 324 may cause the UE 104 and/or one or more of the TRPs 102A, 102B to perform one or more remedial actions. In another aspect, determination of whether a handover of a TRP is ongoing may be made by a network entity in Radio Access Network (e.g., Radio Resource Control associated with one or more of a gNB, CU, DU) and the network entity may forward a message with the determination. Based on the message and one or more additional factors (e.g., number of other TRPs that the UE is communicatively coupled with), a low reliability period may be identified and the network entity reliability component 324 may cause the UE 104 and/or one or more of the TRPs 102A, 102B to perform one or more remedial actions.

In an aspect, the UE reliability component 362 may determine the low reliability period and provide a low reliability period indicator to one or more of TRP 102A and TRP 102B and/or the network entity 160. In another aspect, the TRP reliability component 384 may determine the low reliability period and provide a low reliability indicator to one or more of the UE 104 and/or the network entity 160.

During a low-reliability period, one or more techniques can be used to increase the reliability of communications between the one or more TRPs 102A, 102B and the UE 104. The techniques may occur at one or more of the TRPs 102A, 102B that are associated with the UE 104 and/or at the UE 104. In an aspect, the one or more TRPs 102A, 102B can increase the transmit power of resources associated with the UE 104. By increasing the transmit power, the reliability of the UE 104 receiving a packet increases.

In another aspect, the one or more TRPs 102A, 102B, may use one or more of physical downlink control channel (PDCCH) repetition, increase the aggregation level of PDCCH, provide more frequent channel state information (CSI) reporting, and using lower BLER targets and most recent CSI reports for MCS determination associated with Hybrid Automatic Repeat Request retransmissions. Using PDCCH repetition may include transmitting the same PDCCH transmission on two or more sub-bands. If carrier aggregation is being used, the number of aggregation levels may be increased. Increasing CSI reporting may include increasing the frequency of the CSI reporting.

In another aspect, the one or more TRPs 102A, 102B, may use adaptive channel quality indicator (CQI) filtering. For example, the modulation and coding scheme (MCS) for the communications may be determined using an unfiltered CQI which may allow the TRP 102A, 102B (e.g., base station) to more quickly and efficiently adapt to instantaneous channel conditions.

In another aspect, the one or more TRPs 102A, 102B may bias the CSI used in determining the MCS for the UE 104 to increase reliability of the communications. The bias may be used in the CQI to bias the CQI so that the biased CQI results in a MCS being selected for channel conditions worse than the actual channel conditions. For example, the one or more TRPs 102A, 102B can use a temporary CQI bias to change or bias the CQI values reported by the UE 104. The CQI bias may be simple, e.g., a fixed delta, or more advanced, e.g., based on Machine Learning (ML) techniques used to identify a good bias value.

In another aspect, the one or more TRPs 102A, 102B may assign more grants for re-transmissions to the UE 104. The additional grants may be for uplink retransmissions and/or downlink retransmissions. For example, the one or more TRPs 102A, 102B may increase the number of grants (e.g., by increasing frequency or repetitions) in the semi-persistent scheduling (SPS) to allow for more retransmissions.

In another aspect, the network entity reliability component 324 may request that the one or more TRPs 102A, 102B to add one or more additional component carriers with packet duplication. For example, the one or more TRPs 102A, 102B may increase the number of component carriers that are dedicated to the UE 104.

In another aspect, the one or more TRPs 102A, 102B may use a portion of resources (e.g., resource block (RB) or slot) for each frequency (f1 and f2) which are reserved for transmissions during low reliability periods. For example, the one or more TRPs 102A, 102B may reserve resources, e.g., not used during non-low-reliability periods, and may use these reserved resources during low-reliability periods. The interference experienced in these resources should be smaller than on the other resources given that only a low number of UEs 104 in a network will be in a low reliability period which results in less transmissions and less interference occurring in the reserved resources.

During low reliability periods, the one or more TRPs 102A, 102B may instruct the UE 104 to perform one or more techniques to increase the reliability of the one or more TRPs 102A, 102B to receive one or more communications from the UE 104. The instructions may be sent via a radio resource control (RRC) message, a medium access control message (MAC) control element, etc.

In an aspect, the UE 104 can increase transmit power for one or more of first transmissions and subsequent transmissions to the one or more TRPs 102A, 102B. In another aspect, the UE 104 can use a lower MCS than required for PER target. For example, the UE 104 can use a lower MCS to decrease the number of bits that are sent to the one or more TRPs 102A, 102B. In another aspect, the UE 104 may modify CQI reporting to the one or more TRPs 102A, 102B. For example, the UE 104 may report lower CQI values to the one or more TRPs 102A, 102B which may result in the one or more base stations to adapt to the lower CQI values. In another aspect, the UE 104 may request the one or more TRPs 102A, 102B to implement the one or more techniques discussed above to increase the reliability of transmissions to the UE 104.

The techniques discussed above, e.g., the network or TRP performed techniques and/or the UE performed techniques, may only be used for transmissions for bearers associated with URLLC requirements and not for other bearers. The UE 104 or the one or more TRPS 102A, 102B may inform the other about the start and end of a low-reliability period via one or more messages, and these messages may be forwarded to the network entity reliability component 324.

Figure 4:
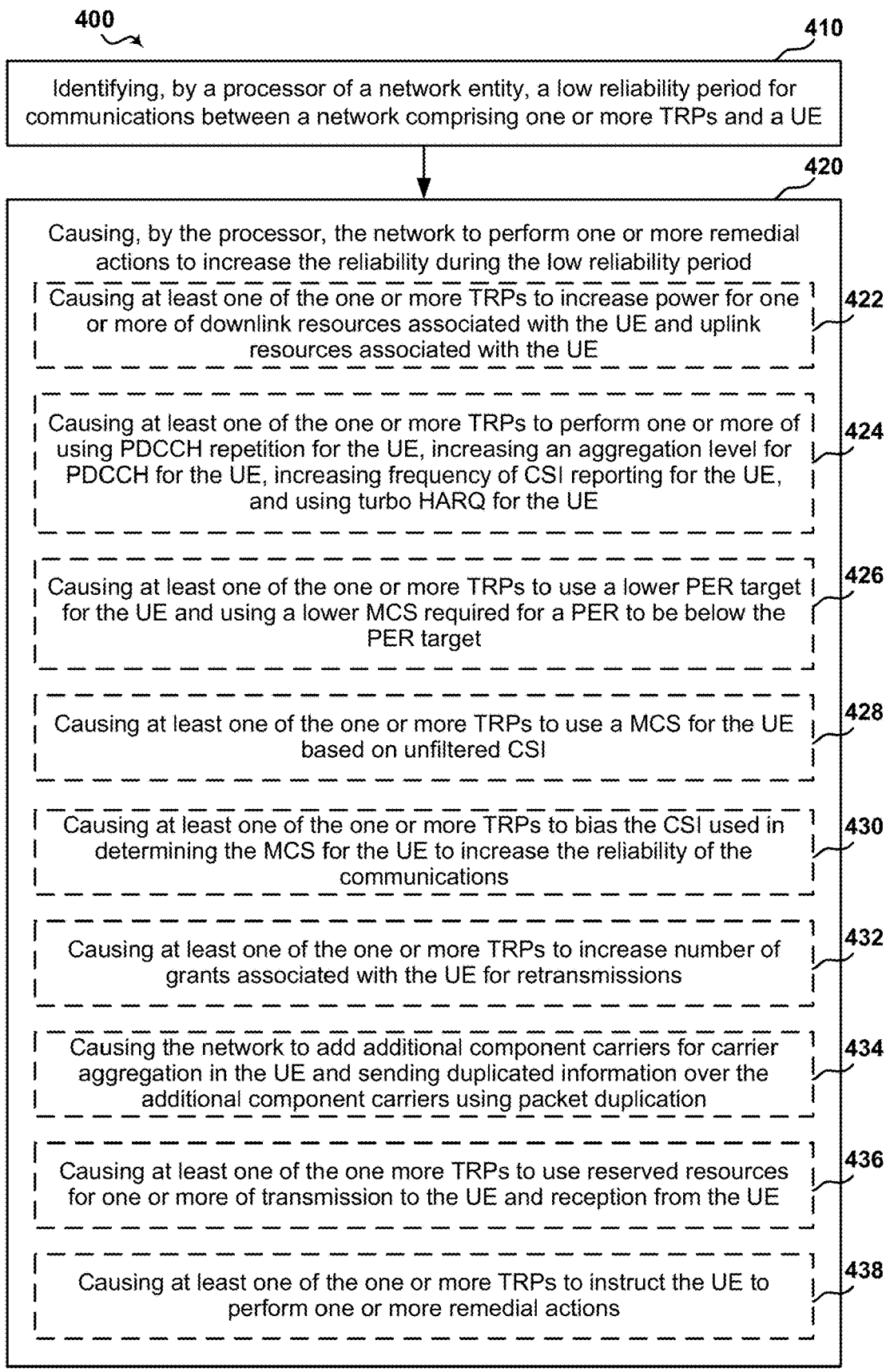
FIG. 4 is a flow diagram of an example of a method for increasing reliability during a low reliability period.

Referring to FIG. 4, a flow diagram showing an example method 400 of operating a network entity according to the above-described aspects to increase reliability during low reliability periods includes one or more of the herein-defined actions.

At block 410, the method 400 may include identifying, by a processor of a network entity, a low reliability period for communications between a network comprising one or more TRPSs and a UE, wherein the communications require a reliability above a first reliability threshold and the low reliability period occurs when reliability for the communications is determined to be below a second reliability threshold. In an aspect, for example, the processor 812 in conjunction with the network entity reliability component 324 may identify a low reliability period for communications between the network 100 comprising one or more TRPs 102A, 102B and a UE 104. In an aspect, the processor 812 in conjunction with the network entity reliability component 324 may identify the low reliability period based on a measurement report from the UE 104 via one or more TRPs 102A, 102B. In another aspect, the processor 712 in conjunction with the TRP reliability component 384 may identify the low reliability period based on a measurement report from the UE 104. In another aspect, the processor 612 in conjunction with the UE reliability component 362 may identify the low reliability period based on a measurement report that the UE 104 generates or based on a measurement that the UE 104 generates, e.g., PER value. In another aspect, the UE reliability component 362 and/or the TRP reliability component 384 may identify the low reliability period and transmit a low reliability period indicator to the network entity reliability component 324. A low reliability period may be determined when reliability for the communications between the UE 104 and the one or more TRPs 102A, 102B is determined to below a second reliability threshold. For example, when the PER falls below the second reliability threshold, a low reliability period may be determined. The second reliability threshold may be the same as the first reliability threshold (e.g., the reliability threshold required for communications between the UE 104 and the one or more TRPs 102A, 102B) or may be a percentage of the first threshold, e.g., 0.99% of the first reliability threshold.

At block 420, the method 400 may include, causing, by the processor, the network to perform one or more remedial actions to increase the reliability during the low reliability period. In an aspect, for the example, the processor 812 in conjunction with the network entity reliability component 324 causes one or more remedial actions to be performed to increase the reliability during the low reliability period.

At block 422, the method 400 may optionally include, causing at least one or more of the TRPs to increase power for one or more of downlink resources associated with the UE and uplink resources associated with the UE. In an aspect, for example, the processor 812 in conjunction with the network entity reliability component 324 may cause one or more of the TRPs 102A, 102B to increase power for one or more of downlink resources associated with the UE 104 and uplink resources associated with the UE 104. For example, the processor 812 in conjunction with the network entity reliability component 324 instructs the one or more TRPs 102A, 102B to increase power on the downlink resources associated with the UE 104 and/or instructs the one or more TRPs 102A, 102B to instruct the UE 104 to increase power on the uplink resources associated with the UE 104.

At block 424, the method 400 may optionally include, causing at least one or more of the TRPs to perform one or more of using PDCCH repetition for the UE, increasing an aggregation level for PDCCH for the UE, increasing of CSI reporting for the UE, and using turbo HARQ for the UE. In an aspect, for example, the processor 812 in conjunction with the network entity reliability component 324 may cause one or more of the TRPs 102A, 102B to use PDCCH repetition for the UE 104, increase an aggregation level for PDCCH for the UE 104, increase CSI reporting for the UE 104, and use turbo HARQ for the UE 104. For example, the processor 812 in conjunction with the network entity reliability component 324 instructs the one or more of the TRPs 102A, 102B to use PDCCH repetition for the UE 104, increase an aggregation level for PDCCH for the UE 104, increase CSI reporting for the UE 104, and use turbo HARQ for the UE 104.

At block 426, the method 400 may optionally include, causing at least one or more of the TRPs to use a lower PER target for the UE and using a lower MCS required for a PER to be below the PER target. In an aspect, for example, the processor 812 in conjunction with the network entity reliability component 324 may cause one or more of the TRPs 102A, 102B to use a lower PER target for the UE 104 and using a lower MCS required for a PER to be below the PER target. For example, the processor 812 in conjunction with the network entity reliability component 324 instructs the one or more of the TRPs 102A, 102B to use a lower PER target for the UE 104 and using a lower MCS required for a PER to be below the PER target.

At block 428, the method 400 may optionally include, causing at least one or more of the TRPs to use a MCS for the UE based on unfiltered CSI. In an aspect, for example, the processor 812 in conjunction with the network entity reliability component 324 may cause one or more of the TRPs 102A, 102B to use a MCS for the UE 104 based on the unfiltered CSI. for example, the processor 812 in conjunction with the network entity reliability component 324 instructs the one or more of the TRPs 102A, 102B to use a MCS for the UE 104 based on the unfiltered CSI At block 430, the method 400 may optionally include, causing at least one or more of the TRPs to bias the CSI used in determining the MCS for the UE to increase the reliability of the communications. In an aspect, for example, the processor 812 in conjunction with the network entity reliability component 324 may cause one or more of the TRPs 102A, 102B to bias the CSI used in determining the MCS for the UE 104 to increase the reliability of the communications. For example, the processor 812 in conjunction with the network entity reliability component 324 instructs the one or more of the TRPs 102A, 102B to bias the CSI used in determining the MCS for the UE 104 to increase the reliability of the communications At block 432, the method 400 may optionally include, causing at least one or more of the TRPs to increase the number of grants associated with the UE for retransmissions. In an aspect, for example, the processor 812 in conjunction with the network entity reliability component 324 may cause one or more of the TRPs 102A, 102B to increase the number of grants associated with the UE 104 for retransmissions. For example, the processor 812 in conjunction with the network entity reliability component 324 instructs the one or more of the TRPs 102A, 102B to increase the number of grants associated with the UE 104 for retransmissions. The grants can be for downlink retransmissions and/or uplink retransmissions.

At block 434, the method 400 may optionally include, causing the network to add additional component carriers for carrier aggregation in the UE and sending duplicated information over the additional component carriers using packet duplication. In an aspect, for example, the processor 812 in conjunction with the network entity reliability component 324 may cause one or more of the TRPs 102A, 102B to add additional component carriers for carrier aggregation in the UE 104 and sending duplicated information over the additional component carriers using packet duplication. For example, the processor 812 in conjunction with the network entity reliability component 324 instructs the one or more of the TRPs 102A, 102B to add additional component carriers for carrier aggregation in the UE 104 and sending duplicated information over the additional component carriers using packet duplication.

At block 436, the method 400 may optionally include, causing at least one or more of the TRPs to use reserved resources for one or more of transmission to the UE and reception from the UE. In an aspect, for example, the processor 812 in conjunction with the network entity reliability component 324 may cause one or more of the TRPs 102A, 102B to use reserved resources for one or more of transmission to the UE 104 and reception from the UE 104. For example, the processor 812 in conjunction with the network entity reliability component 324 instructs the one or more of the TRPs 102A, 102B to use reserved resources for one or more of transmission to the UE 104 and reception from the UE 104. The reserved resources may be reserved during the non-low reliability period and may be used only during the low reliability period.

Figure 5:
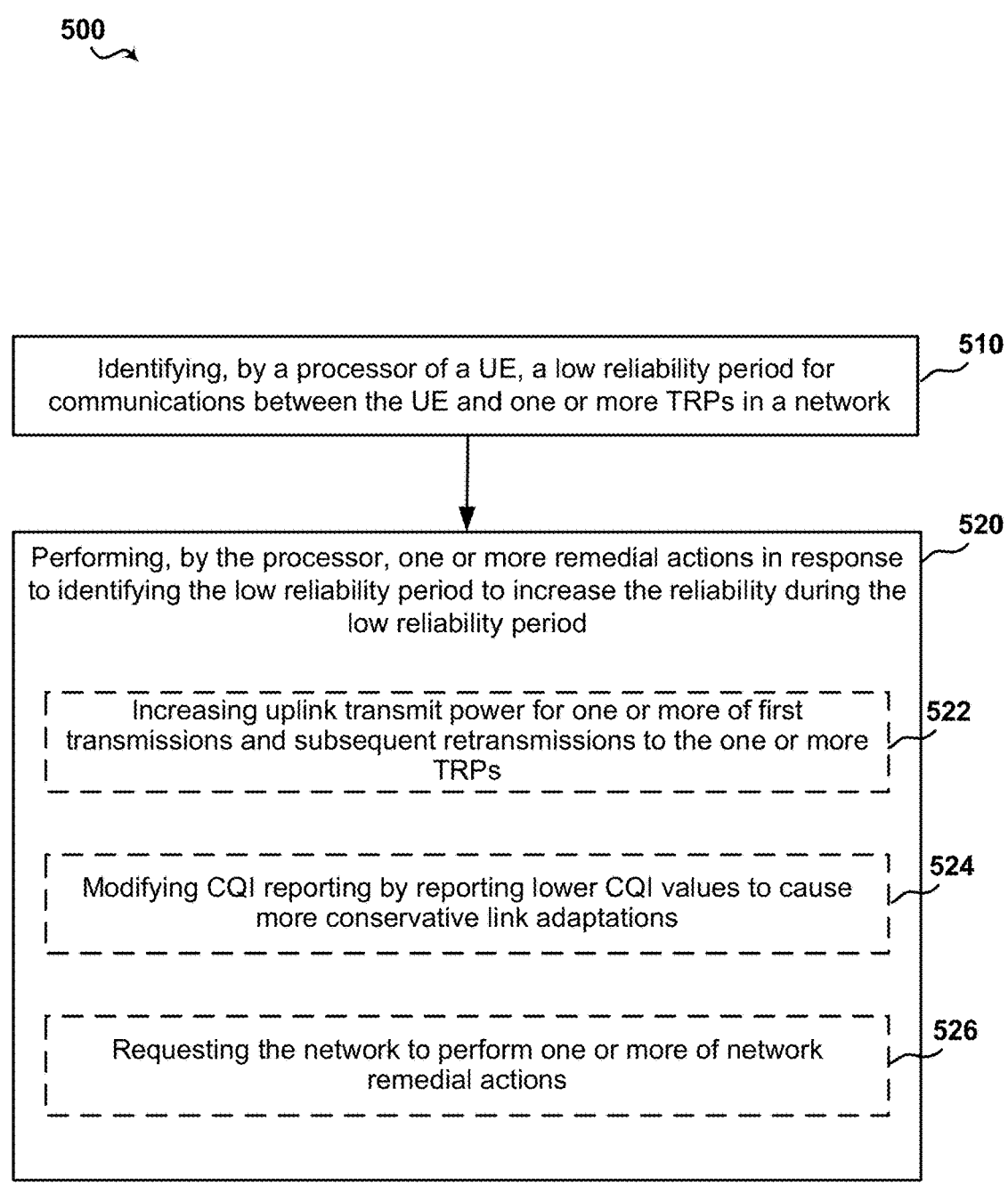
FIG. 5 is a flow diagram of an example of a method for increasing reliability during a low reliability period by a UE performing one or more remedial actions.

At block 438, the method 400 may optionally include, causing at least one or more of the TRPs to instruct the UE to perform one or more remedial actions. In an aspect, for example, the processor 812 in conjunction with the network entity reliability component 324 may cause one or more of the TRPs 102A, 102B to instruct the UE reliability component 362 to cause the UE 104 to perform one or more remedial actions. For example, the processor 812 in conjunction with the network entity reliability component 324 instructs the one or more of the TRPs 102A, 102B to instruct the UE reliability component 362 to cause the UE 104 to perform one or more remedial actions. FIG. 5 describes the one or more remedial actions that may be performed by the UE 104.

Referring to FIG. 5, a flow diagram showing an example method 500 of operating a UE according to the above-described aspects to increase reliability during low reliability periods includes one or more of the herein-defined actions.

At block 510, the method 500 may include identifying, by a processor of the UE, a low reliability period for communications between the UE and the one or more TRPs in a network, wherein the communications require a reliability above a first reliability threshold and the low reliability period occurs when reliability for the communications is determined to be below a second reliability threshold. In an aspect, for example, the processor 612 in conjunction with the UE reliability component 362 may identify a low reliability period for communications between the UE 104 and the one or more TRPs 102A, 102B in a network 100. In an aspect, the identifying may include the UE 104 determining the low reliability period based on one or more values in a measurement report or one or more values that the UE 104 generates for a measurement report. In another aspect, the identifying may include the UE 104 receiving a low reliability period indicator from one or more of the TRPs 102A, 102B and/or from the network entity 160. In another aspect, the identifying may include the UE 104 receiving an instruction to perform one or more remedial actions.

At block 520, the method 400 may include performing one or more remedial actions by the UE in response to identifying the low reliability period. In an aspect, for example, the processor in conjunction with the UE reliability component 362 may perform one or more remedial actions in response to identifying the low reliability period.

At block 522, the method 500 may optionally include, causing the UE to increase power for one or more of first transmission and subsequent retransmissions to the one or more TRPs. In an aspect, for example, the processor 612 in conjunction with the UE reliability component 362 may increase power for one or more of first transmission and subsequent retransmissions to the one or more TRPs 102A, 102B.

At block 524, the method 500 may optionally include, modifying CQI reporting by reporting lower CQI values to cause more conservative link adaptations. In an aspect, for example, the processor 612 in conjunction with the UE reliability component 362 may modify CQI reporting by reporting one or more lower CQI values to one or more TRPs 102A, 102B to cause more conservative link adaptations. The lower CQI values are lower than the CQI values that the UE 104 determined or calculated.

At block 526, the method 500 may optionally include, requesting the network to perform one or more of the network remedial actions. In an aspect, for example, the processor 612 in conjunction with the UE reliability component 362 to request the network to perform one or more of the network remedial actions, e.g., one or more of blocks 422-436 of FIG. 4.

In addition, to the blocks of FIGS. 4 and 5, the methods 400 and/or 500 may include one or more of the UE 104, TRP 102A and TRP 102B indicating a start of the low reliability period and indicating an end of the low reliability period. In an aspect, for example, the processor 612 in conjunction with the UE reliability component 362 may send an indication to the one or more TRPs 102A, 102B that the communications between the UE 104 and the one or more TRPs 102A, 102B have entered or started experiencing a low reliability period and/or that a low reliability period has ended. In an aspect, for example, the processor 612 in conjunction with the TRP reliability component 384 may send an indication to the network entity reliability component 324 that the communications between the UE 104 and the one or more TRPs 102A, 102B have entered or started experiencing a low reliability period and/or that a low reliability period has ended.

Figure 6:
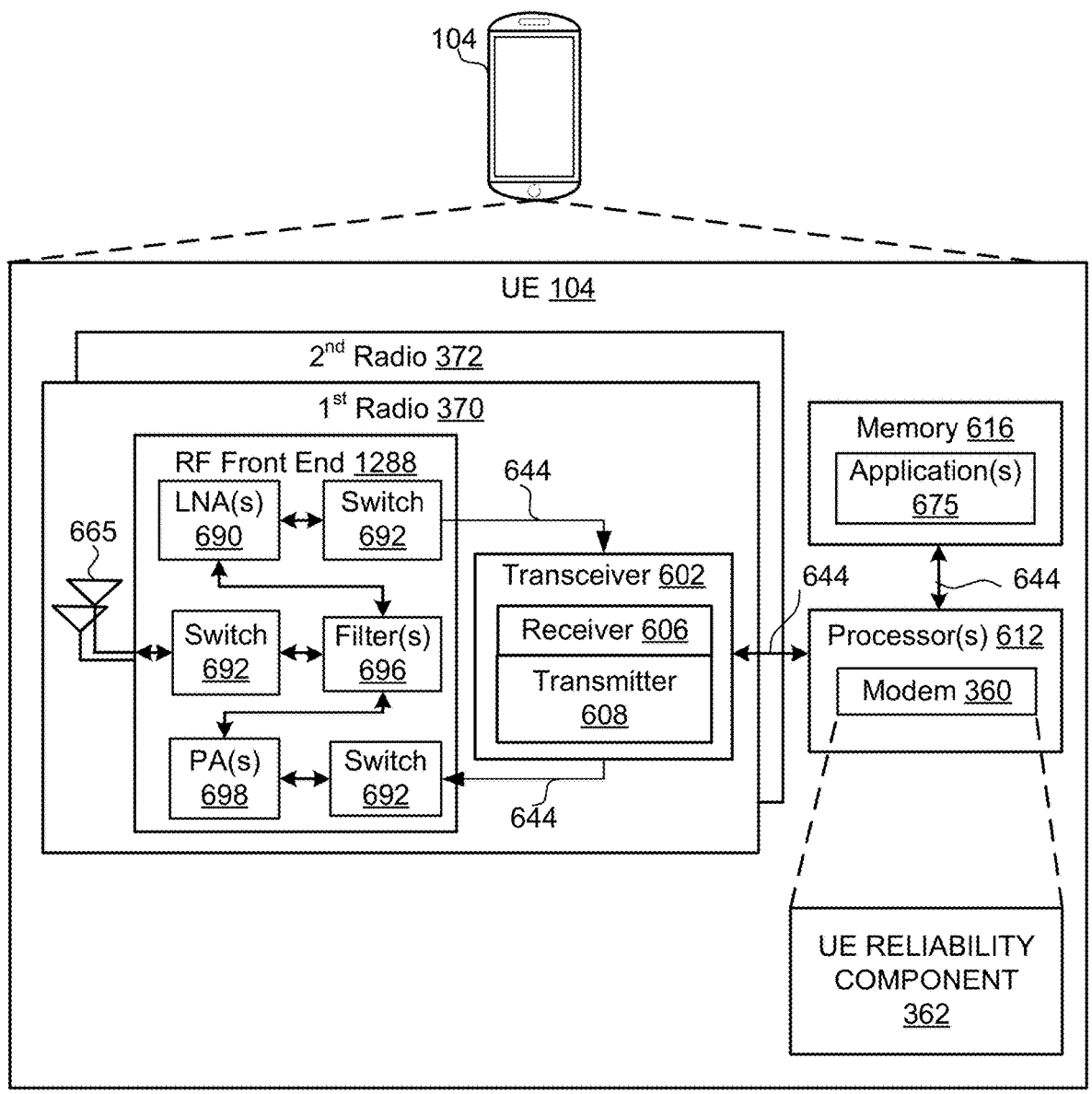
FIG. 6 is a schematic diagram of example components of the UE of FIG. 1.

Referring to FIG. 6 one example of an implementation of UE 104 may include a variety of components, some of which have already been described above, but including components such as one or more processors 612 and memory 616 and transceiver 602 in communication via one or more buses 644, which may operate in conjunction with modem 360 and UE reliability component 362 to enable one or more of the functions described herein related to increasing reliability during low reliability periods. Further, the one or more processors 612, modem 360, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 360 that uses one or more modem processors. The various functions related to UE reliability component 362 may be included in modem 360 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 360 associated with UE reliability component 362 may be performed by transceiver 602.

Also, memory 616 may be configured to store data used herein and/or local versions of applications 675 or UE reliability component 362 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining UE reliability component 362 and/or one or more of its subcomponents, and/or data associated therewith, when UE 104 is operating at least one processor 612 to execute UE reliability component 362 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 402. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 104 may include RF front end 688, which may operate in communication with one or more antennas 665 and transceiver 602 for receiving and transmitting radio transmissions, for example, wireless communications transmitted by at least one TRP 102A, 102B or wireless transmissions transmitted by UE 104. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 1202 and/or processor 612.

As such, transceiver 602 may be configured to transmit and receive wireless signals through one or more antennas 665 via RF front end 688. In an aspect, transceiver may be tuned to operate at specified frequencies such that UE 104 can communicate with, for example, one or more base stations 402 or one or more cells associated with one or more base stations 402. In an aspect, for example, modem 360 can configure transceiver 602 to operate at a specified frequency and power level based on the UE configuration of the UE 104 and the communication protocol used by modem 360.

In an aspect, modem 360 can be a multiband-multimode modem, which can process digital data and communicate with transceiver 602 such that the digital data is sent and received using transceiver 602. In an aspect, modem 360 can be multiband and be configured to support multiple frequency bands for a specific communications protocol. In an aspect, modem 360 can be multimode and be configured to support multiple operating networks and communications protocols. In an aspect, modem 360 can control one or more components of UE 104 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Figure 7:
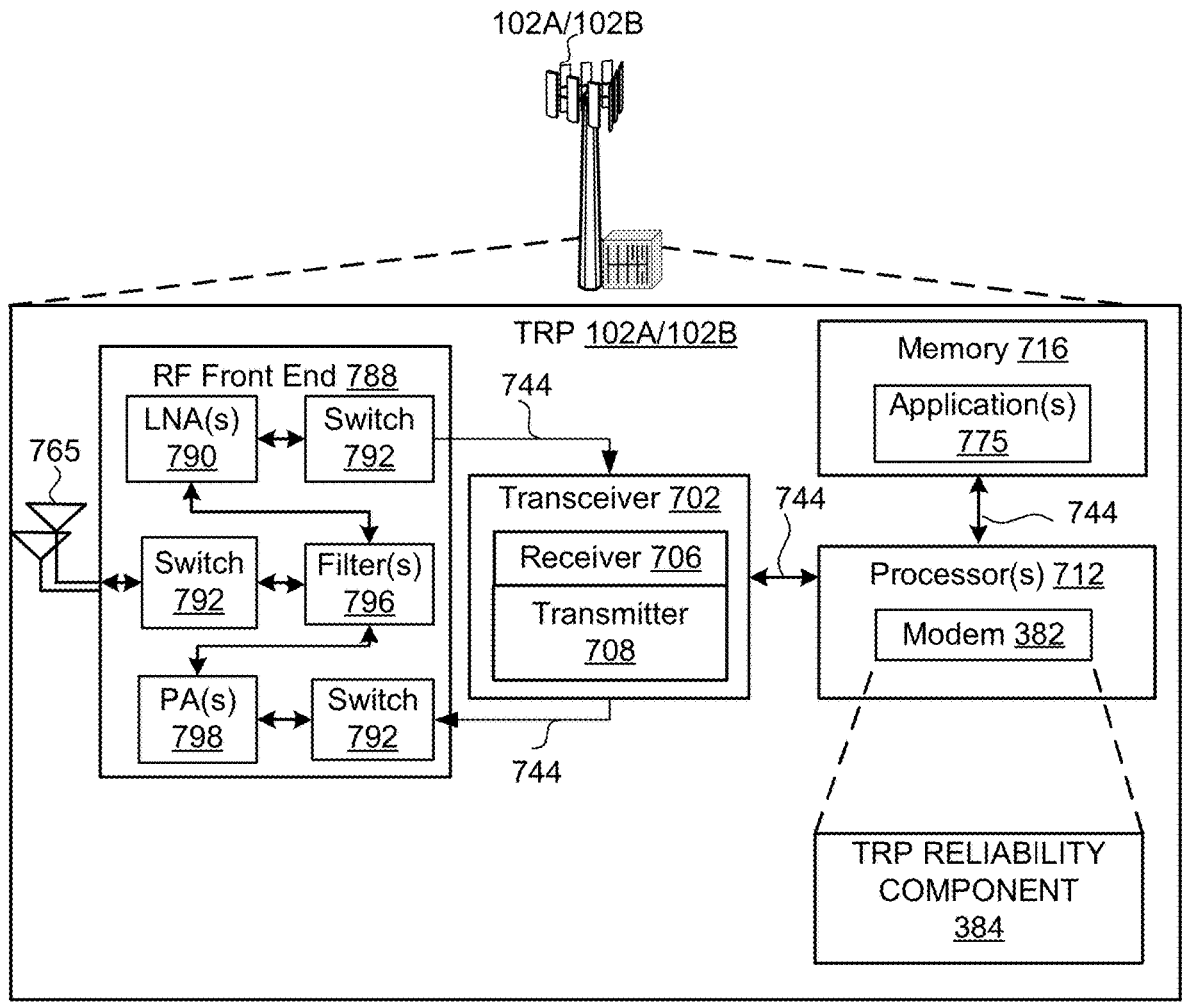
FIG. 7 is a schematic diagram of example components of the TRPs of FIG. 1.

Referring to FIG. 7, one example of an implementation of TRP 102 may include a variety of components, some of which have already been described above, but including components such as one or more processors 712 and memory 716 and transceiver 702 in communication via one or more buses 744, which may operate in conjunction with modem 382 and TRP reliability component 384 to enable one or more of the functions described herein related to increasing reliability during low reliability periods.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of UE 104, as described above, but configured or otherwise programmed for TRP operations as opposed to UE operations.

Figure 8:
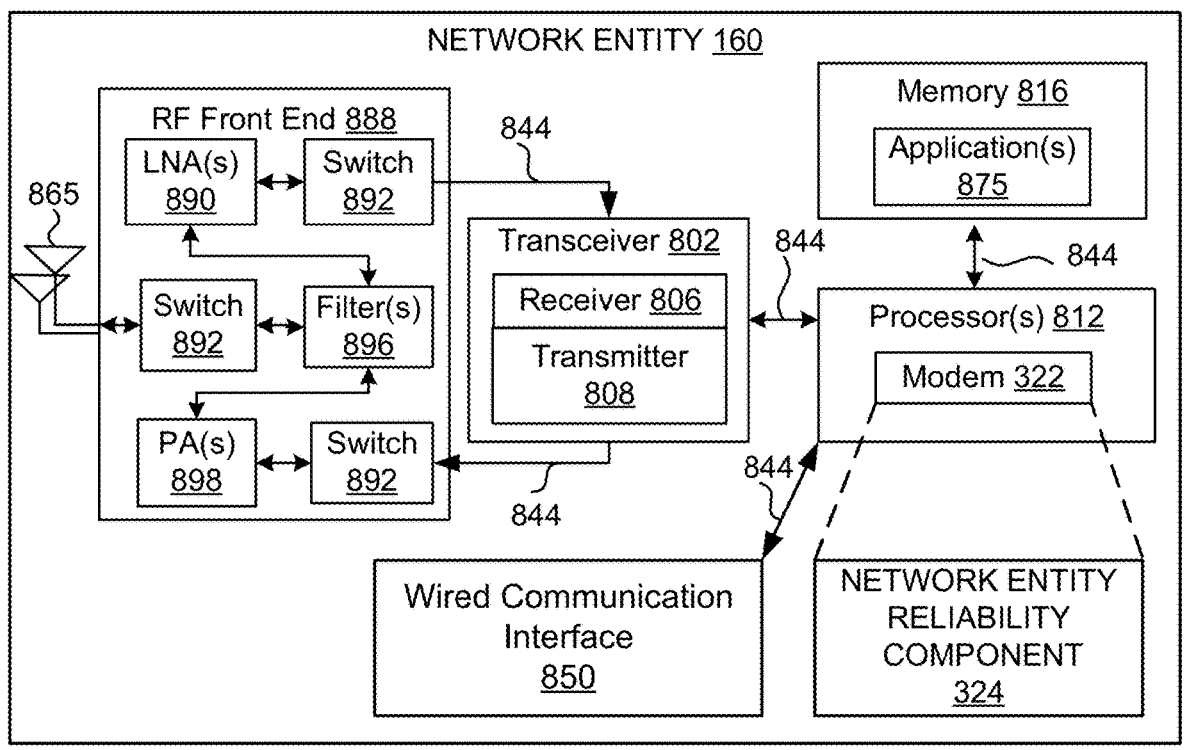
FIG. 8 is a schematic diagram of example components of the network entity of FIG. 1.

Referring to FIG. 8, one example of an implementation of network entity 160 may include a variety of components, some of which have already been described above, but including components such as one or more processors 812 and memory 816 and transceiver 802 in communication via one or more buses 844, which may operate in conjunction with modem 322 and network entity reliability component 324 to enable one or more of the functions described herein related to increasing reliability during low reliability periods. In an aspect, the network entity 160 may not include a modem 322 and/or the network entity reliability component may be outside of a modem 322. In another example, the network entity 160 may include a wired communication interface 850 which may operate in conjunction with modem 322 and network entity reliability component 324 to enable one or more of the functions described herein related to increasing reliability during low reliability periods. The transceiver 802, receiver 806, transmitter 808, one or more processors 813, memory 816, applications 875, buses 844, RF front end 888, LNAs 890, switches 892, filters 896, PAs 898, and one or more antennas 865 may be the same as or similar to the corresponding components of UE 104, as described above, but configured or otherwise programmed for network entity operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

SOME FURTHER EXAMPLE EMBODIMENTS

An example method of wireless communications comprising: identifying, by a processor of a network entity, a low reliability period for communications between a network comprising one or more transmit/receive points (TRPs) and a user equipment (UE), wherein the communications require a reliability above a first reliability threshold and the low reliability period occurs when reliability for the communications is determined to be below a second reliability threshold; and causing, by the processor, the network to perform one or more remedial actions to increase the reliability during the low reliability period.

The above example method, wherein the reliability for the communications is determined to be below the second reliability threshold during one or more of replacing a TRP among the one or more TRPs, removing a TRP among the one or more TRPs, or adding a TRP among the one or more TRPs.

One or more of the above example methods, wherein the one or more remedial actions further comprises causing at least one of the one or more TRPs to increase transmit power for one or more of downlink resources associated with the UE and uplink resources associated with the UE.

One or more of the above example methods, wherein the one or more remedial actions further comprises causing at least one of the one or more TRPs to execute one or more of using physical downlink control channel (PDCCH) repetition for the UE, increasing an aggregation level for PDCCH for the UE, increasing frequency of channel state information (CSI) reporting for the UE, or using turbo HARQ for the UE.

One or more of the above example methods, wherein the one or more remedial actions further comprises causing at least one of the one or more TRPs to use a lower packet error rate (PER) target for the UE, or using a lower modulation and coding scheme (MCS) required for a packet error rate (PER) to be below the PER target.

One or more of the above example methods, wherein the one or more remedial actions further comprises causing at least one of the one or more TRPs to use a modulation and coding scheme (MCS) for the UE based on unfiltered channel state information (CSI).

One or more of the above example methods, wherein the one or more remedial actions further comprises causing at least one of the one or more TRPs to bias channel state information (CSI) used in determining MCS for the UE to increase the reliability of the communications.

One or more of the above example methods, wherein the one or more remedial actions further comprises causing at least one of the one or more TRPs to increase number of grants associated with the UE for retransmissions, wherein the one or more remedial actions further comprises causing the network to add additional component carriers for carrier aggregation in the UE and sending duplicated information over the additional component carriers using packet duplication.

One or more of the above example methods, wherein the one or more remedial actions further comprises causing at least one of the one or more TRPs to use reserved resources for one or more of transmission to the UE and reception from the UE.

One or more of the above example methods, wherein the one or more remedial actions further comprises causing at least one of the one or more TRPs to request the UE to perform one or more remedial actions.

One or more of the above example methods, wherein in response to the request to the UE to perform one or more remedial actions, increasing transmit power for one or more of uplink resources associated with the UE.

One or more of the above example methods, wherein in response to the request to the UE to perform one or more remedial actions, modifying a channel quality indicator (CQI) report by lowering one or more CQI values in the CQI report.

One or more of the above example methods, wherein in response to the request to the UE to perform one or more remedial actions, requesting the network to perform one or more network based remedial actions.

An example device (e.g., a network entity) comprising: a transceiver, a memory configured to store instructions, and one or more processors communicatively coupled with the transceiver and the memory, wherein the one or more processors are configured to perform all or part of one or more of the above example methods.

An example device (e.g., a network entity) comprising means for wireless communication, means for storing instructions and data, and means for performing all or part of one or more of the above example methods.

A second example method of wireless communications comprising: identifying, by a processor of a user equipment (UE), a low reliability period for communications between the UE and one or more transmit/receive points (TRPs) in a network, wherein the communications require a reliability above a first reliability threshold and the low reliability period occurs when reliability of the communications is determined to be below a second reliability threshold; and performing, by the processor, one or more remedial actions in response to identifying the low reliability period.

The above example method, wherein the reliability for the communications is determined to be below the second reliability threshold during one or more of: replacing a TRP among the one or more TRPs, removing a TRP among the one or more TRPs, or adding a TRP among the one or more TRP.

One or more of the above example methods, wherein the one or more remedial actions comprises increasing uplink transmit power for one or more of first transmissions and subsequent retransmissions to the one or more TRPs.

One or more of the above example methods, wherein the one or more remedial actions comprises modifying channel quality indicator (CQI) reporting by reporting lower CQI values to cause more conservative link adaptations.

One or more of the above example methods, wherein the one or more remedial actions comprises requesting the network to perform one or more network remedial actions.

An example device (e.g., a user equipment) comprising: a transceiver, a memory configured to store instructions, and one or more processors communicatively coupled with the transceiver and the memory, wherein the one or more processors are configured to perform all or part of one or more of the above example methods.

An example device (e.g., a user equipment) comprising means for wireless communication, means for storing instructions and data, and means for performing all or part of one or more of the above example methods.

What is claimed is:

1. A method for wireless communications comprising:
   identifying, by a processor of a network entity, a low reliability period for communications between a network comprising one or more transmit/receive points (TRPs) and a user equipment (UE), wherein the communications require a reliability above a first reliability threshold and the low reliability period occurs when reliability for the communications is determined to be below a second reliability threshold; and
   causing, by the processor, the network to perform one or more remedial actions to increase the reliability during the low reliability period,
   wherein the second reliability threshold is at least one of lower or a percentage of the first reliability threshold.

2. The method of claim 1, wherein the reliability for the communications is determined to be below the second reliability threshold during one or more of replacing a TRP among the one or more TRPs, removing a TRP among the one or more TRPs, or adding a TRP among the one or more TRPs.

3. The method of claim 1, wherein the one or more remedial actions further comprises causing at least one of the one or more TRPs to increase transmit power for one or more of downlink resources associated with the UE and uplink resources associated with the UE.

4. The method of claim 1, wherein the one or more remedial actions further comprises causing at least one of the one or more TRPs to execute one or more of using physical downlink control channel (PDCCH) repetition for the UE, increasing an aggregation level for PDCCH for the UE, increasing frequency of channel state information (CSI) reporting for the UE, or using turbo HARQ for the UE.

5. The method of claim 1, wherein the one or more remedial actions further comprises causing at least one of the one or more TRPs to use a lower packet error rate (PER) target for the UE, or using a lower modulation and coding scheme (MCS) required for a packet error rate (PER) to be below the PER target.

6. The method of claim 1, wherein the one or more remedial actions further comprises causing at least one of the one or more TRPs to use a modulation and coding scheme (MCS) for the UE based on unfiltered channel state information (CSI).

7. The method of claim 1, wherein the one or more remedial actions further comprises causing at least one of the one or more TRPs to bias channel state information (CSI) used in determining MCS for the UE to increase the reliability of the communications.

8. The method of claim 1, wherein the one or more remedial actions further comprises causing at least one of the one or more TRPs to increase number of grants associated with the UE for retransmissions.

9. The method of claim 1, wherein the one or more remedial actions further comprises causing the network to add additional component carriers for carrier aggregation in the UE and sending duplicated information over the additional component carriers using packet duplication.

10. The method of claim 1, wherein the one or more remedial actions further comprises causing at least one of the one or more TRPs to use reserved resources for one or more of transmission to the UE and reception from the UE.

11. The method of claim 1, wherein the one or more remedial actions further comprises causing at least one of the one or more TRPs to request the UE to perform one or more remedial actions.

12. The method of claim 11, wherein in response to the request to the UE to perform one or more remedial actions, increasing transmit power for one or more of uplink resources associated with the UE.

13. The method of claim 11, wherein in response to the request to the UE to perform one or more remedial actions, modifying a channel quality indicator (CQI) report by lowering one or more CQI values in the CQI report.

14. The method of claim 11, wherein in response to the request to the UE to perform one or more remedial actions, requesting the network to perform one or more network based remedial actions.

15. A network entity for wireless communications comprising:
   a memory; and
   a processor communicatively coupled with the memory and configured to:
     identify a low reliability period for communications between a network comprising one or more transmit/receive points (TRPs) and a user equipment (UE), wherein the communications require a reliability above a first reliability threshold and the low reliability period occurs when reliability for the communications is determined to be below a second reliability threshold; and
     cause the network to perform one or more remedial actions to increase the reliability during the low reliability period,
     wherein the second reliability threshold is at least one of lower or a percentage of the first reliability threshold.

16. The network entity of claim 15, wherein the reliability for the communications is determined to be below the second reliability threshold during one or more of: replacing a TRP among the one or more TRPs, removing a TRP among the one or more TRPs, or adding a TRP among the one or more TRP.

17. A method for wireless communications comprising:
   identifying, by a processor of a user equipment (UE), a low reliability period for communications between the UE and one or more transmit/receive points (TRPs) in a network, wherein the communications require a reliability above a first reliability threshold and the low reliability period occurs when reliability of the communications is determined to be below a second reliability threshold; and performing, by the processor, one or more remedial actions in response to identifying the low reliability period, wherein the second reliability threshold is at least one of lower or a percentage of the first reliability threshold.

18. The method of claim 17, wherein the reliability for the communications is determined to be below the second reliability threshold during one or more of: replacing a TRP among the one or more TRPs, removing a TRP among the one or more TRPs, or adding a TRP among the one or more TRP.

19. The method of claim 17, wherein the one or more remedial actions comprises increasing uplink transmit power for one or more of first transmissions and subsequent retransmissions to the one or more TRPs.

20. The method of claim 17, wherein the one or more remedial actions comprises modifying channel quality indicator (CQI) reporting by reporting lower CQI values to cause more conservative link adaptations.

21. The method of claim 17, wherein the one or more remedial actions comprises requesting the network to perform one or more network remedial actions.

22. A user equipment (UE) for wireless communications comprising:
a memory; and
a processor communicatively coupled with the memory and configured to:

identifying, by a processor of the UE, a low reliability period for communications between the UE and one or more transmit/receive points (TRPs) in a network, wherein the communications require a reliability above a first reliability threshold and the low reliability period occurs when reliability of the communications is determined to be below a second reliability threshold; and performing, by the processor, one or more remedial actions in response to identifying the low reliability period, wherein the second reliability threshold is at least one of lower or a percentage of the first reliability threshold.

23. The UE of claim 22, wherein the reliability for the communications is determined to be below the second reliability threshold during one or more of: replacing a TRP among the one or more TRPs, removing a TRP among the one or more TRPs, or adding a TRP among the one or more TRP.

24. The UE of claim 22, wherein the one or more remedial actions comprises increasing uplink transmit power for one or more of first transmissions and subsequent retransmissions to the one or more TRPs.

25. The UE of claim 22, wherein the one or more remedial actions comprises modifying channel quality indicator (CQI) reporting by reporting lower CQI values to cause more conservative link adaptations.

26. The UE of claim 22, wherein the one or more remedial actions comprises requesting the network to perform one or more network remedial actions.

* * * * *